(No Model.)
J. T. HAMILTON.
COUPLING FOR CULTIVATOR BEAMS.
No. 252,763. Patented Jan. 24, 1882.
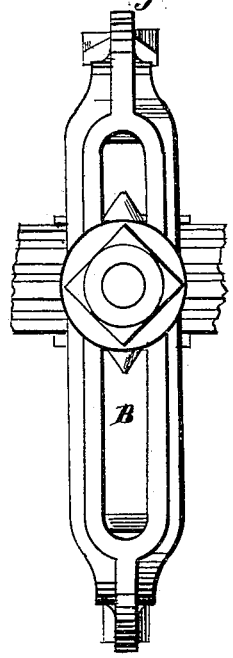
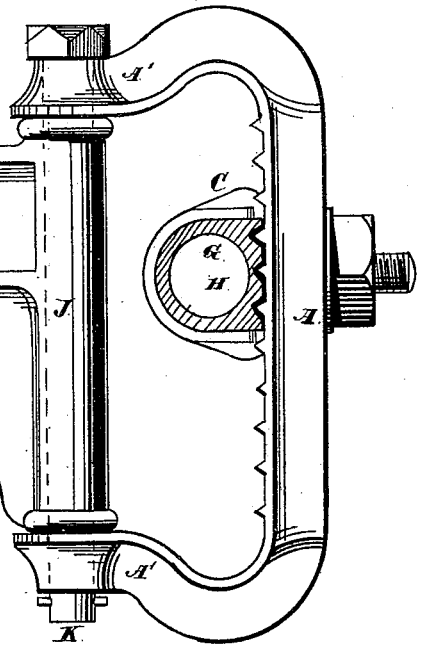
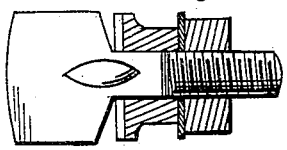
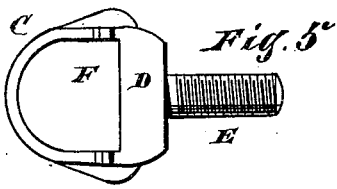
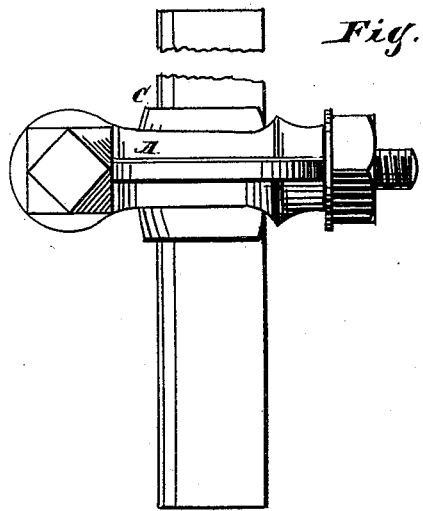
Witnesses:
Albert H. Adams.
Henr. L. Bruns.
Inventor:
James T. Hamilton
By West & Bond
His Attys.

UNITED STATES PATENT OFFICE.

JAMES T. HAMILTON, OF MOLINE, ILLINOIS, ASSIGNOR TO HIMSELF AND WILLIAM K. HOAGLAND, OF COUNCIL BLUFFS, IOWA.

COUPLING FOR CULTIVATOR-BEAMS.

SPECIFICATION forming part of Letters Patent No. 252,763, dated January 24, 1882.

Application filed November 10, 1880. (No model.)

*To all whom it may concern:*

Be it known that I, JAMES T. HAMILTON, residing at Moline, in the county of Rock Island and State of Illinois, and a citizen of the United States, have invented new and useful Improvements in Couplings for Cultivator-Beams, of which the following is a full description, reference being had to the accompanying drawings, in which—

Figure 1 is a side elevation of the coupling; Fig. 2, a plan view with the beam-section removed; Fig. 3, a front view, both sides of the axle-sleeve being broken or separated; Figs. 4 and 5, details showing the construction of the clamping-eyebolt.

An essential feature which enters into the construction of a cultivator is the adjustment of the beams and shovels in their relation to the ground and plants to have the shovels do their work in a proper manner. The adjustments required are longitudinal and vertical—the longitudinal to set the beams and shovels to conform to the distance between the rows, and the vertical to adjust the beams and shovels to regulate the running depth. The usual method for attaining these adjustments is by means of a coupling connecting the forward end of the plow-beam to the axle, which coupling should have additional features of construction, which will allow the plow-beam to be raised vertically to clear obstructions, and to be swung laterally to dodge plants which are out of the row, both of which movements are independent of the longitudinal and vertical adjustments.

The object of this invention is to secure a vertical adjustment for regulating the running depth by simply changing the height at which the forward end of the beam stands relative to the axle without disconnecting the sleeve connecting the coupling with the axle or changing its position on the axle, and have the adjustments in no way interfere with the functions of the coupling or decrease its qualities as a coupling; and its nature consists in providing a coupling formed in two sections, both standing vertical, one section of which has a stirrup or clevis form, and is provided with a vertical slot to receive an eyebolt and attach the coupling to the axle-sleeve, and the other formed and adapted to receive the beam and be attached by a pin or bolt between the open ends of the clevis-section, so that by loosening the eyebolt the stirrup and end of the beam can be raised or lowered to adjust the shovels to the desired running depth; in providing the eyebolt with a shoulder to enter the slot of the clevis-section and retain the coupling in a vertical position; and in providing serrations or corrugations formed on the inner edge or face of the clevis-section, to engage with corresponding serrations or corrugations formed on the adjacent face of the axle-sleeve to add steadiness to the parts and assist in securing an accurate and perfect adjustment.

In the drawings, A A' represent the clevis or axle section of the coupling; B, the vertical adjusting-slot; C, the retaining-eyebolt; D, the central flange or shoulder of the eyebolt; E, the screw-threaded stem of the eyebolt; F, the opening in the eyebolt for the sleeve; G, the sleeve; H, the opening in the sleeve for the axle; I J, the beam-section of the coupling; K, the connecting bolt or pin.

The section A A' may be made of malleable iron or other suitable material, which can be cast or otherwise formed into a stirrup or clevis shape, the ends of the portions A' having suitable openings for the passage of a pin or bolt, as in an ordinary clevis. The portion A of the section has a central longitudinal slot or opening, B, extending nearly its entire length, and its rear face or edge either side of this slot, as shown, is serrated or grooved.

The eyebolt C, as shown, is made from a single piece of metal formed into shape to have a ring or body of the required shape to receive the sleeve, a projecting shoulder or flange, D, located at the center of the body portion and standing vertical, and a screw-threaded stem, E, projecting horizontally from the center of the flange D. The body or ring of the eyebolt has an opening, F, corresponding in shape to the form of the sleeve, which opening extends into the shoulder or flange D, and the body of the eyebolt projects both sides of the shoulder, and is open on the shoulder side to allow the side of the sleeve to project beyond the plane of its edges. The shoulder D corresponds in width to the width of the slot B, and projects out a distance nearly equal to the depth of the slot. This shoulder enters the slot B, and the section A slides thereon, and its sides bear against the sides of the slot to prevent the eyebolt from turning or twisting; and when the eyebolt is in position on the sleeve the shoulder or flange D retains the section A A' in a vertical position, the body of the eyebolt bearing on the sleeve and holding the shoulder rigid in a vertical position.

The stem E is screw-threaded to receive a suitable nut, and projects beyond the face of the part A, and furnishes the means for drawing the eyebolt down and attaching the section A A' firmly to the sleeve.

The sleeve G may be made of malleable iron or other suitable material, in the form shown, or any other suitable form. As shown, three of its exterior faces or sides are flat or square and the other curved or rounded; and the square face opposite the rounded is provided with serrations or corrugations corresponding to the serrations or corrugations on the edge of the portion A, so that when these adjacent faces are brought together the projections of one will interlock with the serrations or grooves of the other and form a firm union of the sleeve and coupling. The sleeve G has a circular longitudinal opening, H, to receive the axle and permit the sleeve to turn thereon.

The other section of the coupling is made from a single plate of malleable iron or other material, cast or otherwise formed into shape to have a portion, I, for attachment to the forward end of the plow-beam, and a head or socket, J, for uniting the two sections. The head or socket J fits between the outer ends of parts A', and has a central longitudinal opening, so that by passing the pin or bolt K through the holes in parts A' and the hole in socket J the two sections will be united and the beam-section will be free to swing laterally on the pin or bolt. The portion I may be secured to the beam end by means of suitable bolts or otherwise, holes being provided for the passage of the bolts.

The coupling is attached to connect the beam with the frame or axle by placing the sleeve on the axle, with the eyebolt on the sleeve and the shoulder D in the slot B, and the socket J between the ears A', and retained in position by the bolt K.

To adjust the running depth the nut on the stud E is loosened sufficiently to allow the section A A' to be adjusted up or down on the shoulder D, and as the two sections are united by the bolt K it follows that the forward end of the beam must be raised or lowered, and when the desired position is reached the beam can be locked by tightening the nut on the stem E. By raising the forward end of the beam the running depth of the shovels will be less, and by lowering such end the running depth will be greater. To adjust the beams laterally the eyebolt is loosened and slipped to the desired point in or out on the sleeve and then tightened.

This coupling can be adjusted, either laterally or horizontally, in a very quick and efficient manner by means of the eyebolt, and the adjustments can be made very accurate and precise. It has the features of lateral and horizontal swing for the plow-beams, and is very simple in construction, easily adjusted, and when adjusted retains the beams in an upright position. By using the corrugations or serrations the parts are given greater steadiness, and the vertical adjustment of the end of the plow-beams can be made to correspond by having the engagement made with corresponding corrugations or notches.

I am aware that various forms of two-way couplings for plow-beams have been heretofore made and used, and hence do not claim broadly such coupling.

What I claim as new, and desire to secure by Letters Patent, is as follows:

1. In a cultivator, a coupling for the plow-beams, having a section, A A', provided with the slot B and adapted to receive the forward end of the plow-beam, in combination with an eyebolt or connection with the sleeve or axle, for allowing vertical play of the section to raise and lower the forward end of the plow-beam, substantially as and for the purpose specified.

2. In a cultivator, a coupling for the plow-beams, having a section, A A', provided with the slot B and adapted to receive the forward end of the plow-beam, in combination with an eyebolt having a body, C, to receive the axle-sleeve, a screw-threaded stem, E, to receive a nut, and shoulder or flange D, to enter the slot B and sustain the section in a vertical position when the parts are together, substantially as and for the purposes specified.

3. In a cultivator, a coupling for the forward end of the plow-beams, having a section, A A', provided with a slot, B, with the edges or faces adjacent to the slot serrated or grooved, and adapted to receive the forward end of the plow-beam, in combination with an eyebolt, C D E, and sleeve G, having a serrated or grooved face to engage the corresponding face of the part A for maintaining the coupling in a vertical position and adding steadiness to the parts, substantially as specified.

4. In a cultivator, a coupling for attaching the plow-beams, consisting of the section A A', having a slot, B, the eyebolt C D E, the sleeve G, having the longitudinal opening H, the plate I J, and the bolt K, all constructed and arranged substantially as and for the purposes specified.

JAMES T. HAMILTON.

Witnesses:
ANDREW RUNSTETLER,
EUGENE LEWIS.